United States Patent [19]

Smith

[11] 4,329,698
[45] May 11, 1982

[54] DISPOSABLE CARTRIDGE FOR INK DROP PRINTER

[75] Inventor: Normand C. Smith, Endicott, N.Y.

[73] Assignee: International Business Machines Corporation, Armonk, N.Y.

[21] Appl. No.: 218,145

[22] Filed: Dec. 19, 1980

[51] Int. Cl.³ ............................................. G01D 15/16
[52] U.S. Cl. ................................................. 346/140 R
[58] Field of Search .......................... 346/1.1, 75, 140

[56] References Cited

U.S. PATENT DOCUMENTS 3,787,884  1/1974  Demer ................................... 346/75
4,183,031  1/1980  Kyser et al. ................. 346/140 PD Primary Examiner—Donald A. Griffin
Attorney, Agent, or Firm—Kenneth P. Johnson

[57] ABSTRACT

A convenience package for drop-on-demand ink drop recording devices which includes drop generating means for projecting ink droplets to a recording medium, filter means, and the ink supply, all of which are quickly interchangeable, and intended for disposal after the ink supply is exhausted. The cartridge is a compact, inexpensive arrangement that is adaptable to multi-nozzle and multi-color requirements.

23 Claims, 4 Drawing Figures

DISPOSABLE CARTRIDGE FOR INK DROP PRINTER

BACKGROUND OF THE INVENTION

This invention relates generally to an ink droplet recording device and more particularly to such devices in which the droplets of marking fluid are selectively produced only when a mark is to be formed.

Ink drop printers which produce the droplets of marking fluid only as required for recording, known as drop-on-demand recorders, usually provide a print head, having a plurality of nozzles, which traverses a print line of the recording medium and is supplied with ink from a reservoir that is replenished as required. Examples are seen in U.S. Pat. Nos. 4,095,237 and 4,126,868.

Ink replenishment is frequently an inconvenience. Care must be taken to avoid the entrapment of air in the supply lines to the nozzles which would disable the nozzles, and care must be exercised to avoid spillage of a relatively messy liquid. The replenishment containers of ink are often complex in that they require the inclusion of a blotter and pierceable opening through which the ink is supplied to the printhead structure. The usual drop-on-demand printer also requires occasional cleaning which necessitates the removal of the nozzle and pump structure or the substitution of a cleaning liquid for the ink. On occasion, a nozzle becomes clogged so badly that it must be replaced. This may require replacement of the entire printing head.

The known recorders lack the facility for changing the nozzle size, and hence the drop size of the marking liquid. It is frequently desirable to change to fine printing quality by altering the pel or print element density. A further limitation is that of color. When one or more additional colors are to be used, there is usually a duplication of the nozzle structure and ink supply means for the particular color. This adds significant complexity and cost to the marking device.

OBJECTS AND SUMMARY OF THE INVENTION

It is accordingly a primary object of this invention to provide a self-contained cartridge of drop generator, filter and ink supply for an ink drop printer which can be discarded after the ink supply is exhausted.

It is another object of this invention to provide a self-contained cartridge for an ink drop marking device which has a plurality of drop generators with a common ink supply and which is inexpensive and can be discarded when the ink supply is exhausted.

A further object of this invention is to provide a self-contained cartridge for an ink jet printer that fosters quick interchangeability by an operator so that selection can be made from an assortment of cartridges, each having a different color, drop size, reservoir capacity, number of nozzles or chemical or physical ink properties as may be required by the desired print quality or printer performance with the associated recording medium.

Yet another object of this invention is to provide a self-contained ink drop generator cartridge for a printer which has a plurality of ink colors and nozzles, all of which can be discarded when an ink supply is exhausted.

A further object of this invention is to provide a disposable ink and drop generation cartridge for a printing device which is inexpensive to construct, compact and reliable.

The foregoing objects are attained in accordance with the present invention. By providing a two part housing means in which there is resiliently supported piezoelectric drop generation means, filter means and bladder means for holding a supply of marking liquid. The housing means carries the necessary conductors to excite the drop generation means and is mounted on a traversing carrier for printing. Means is provided by which the bladder can be filled and a vent allows collapse of the bladder as marking liquid is consumed. The housing serves to protect the bladder means and maintain the necessary alignment of the nozzle.

The invention has the advantage of minimizing the distance from the ink supply to the nozzle and eliminating any necessary duct from a stationary supply to the traversing carrier. Filled cartridges are easily transportable and manufacturing quality can be efficiently controlled at the point of assembly. The cartridge is readily adaptable to supporting multiple drop generators and bladders, each carrying a different color of marking liquid, if so desired.

The foregoing and other objects, features and advantages of the invention will be apparent when the following more particular description of preferred embodiments of the invention is illustrated in the accompanying drawing.

DESCRIPTION OF THE PREFERRED EMBODIMENTS

Figure 1:
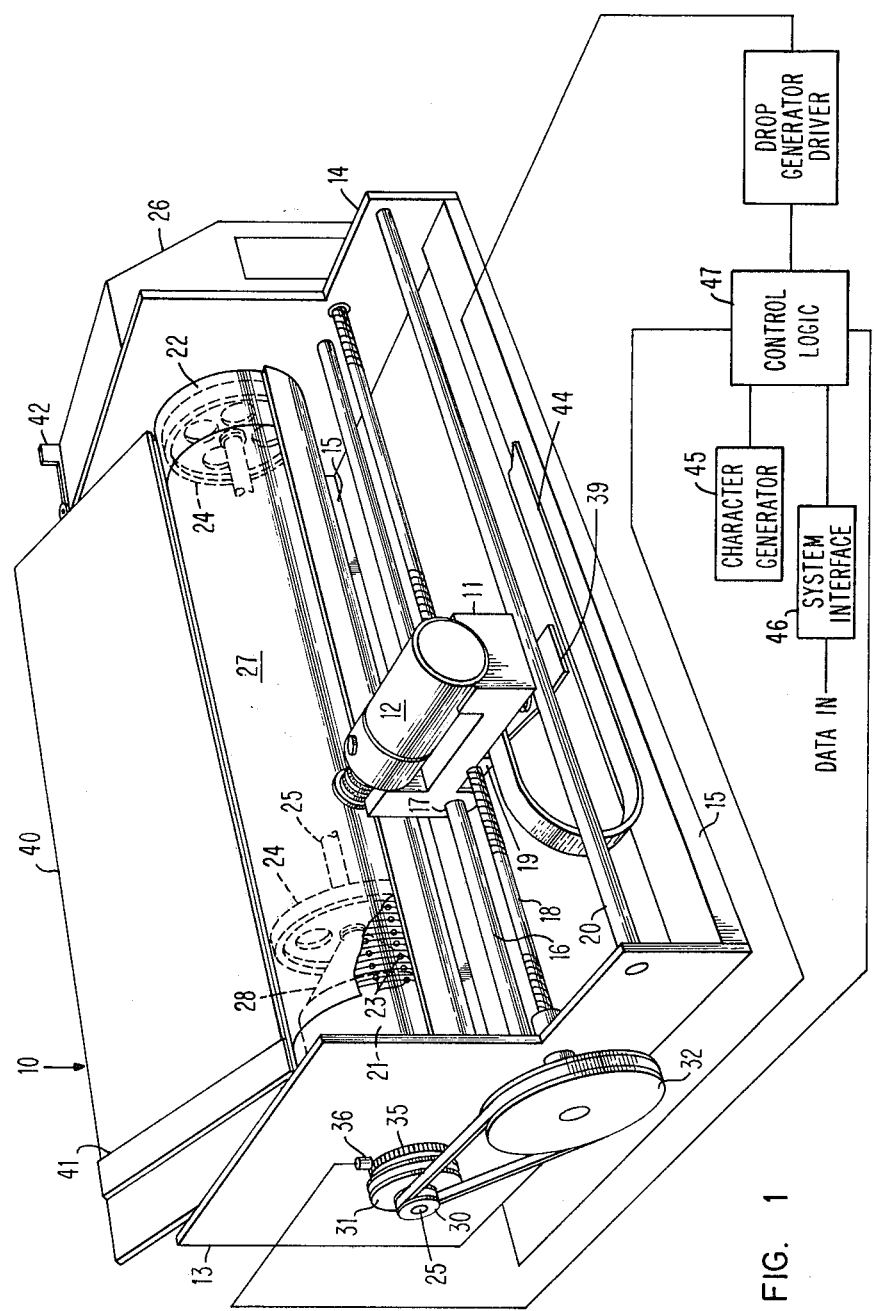
FIG. 1 is a perspective view of a drop-on-demand ink drop printer carrying a cartridge of combined drop generator, filter and ink reservoir constructed in accordance with the principles of the invention.

Referring to FIG. 1, a printing device, indicated generally as 10, has a traversing print head carrier 11 supporting a disposable cartridge 12. The printing device comprises generally a frame of a pair of end plates 13 and 14 spaced from each other by a pair of bars 15. Carrier 11 is mounted on guide rod 16 by means of opening 17 and engages the threads of lead screw 18 through depending half-nut 19. A rod 20 also serves to support the opposite end of the carrier 11.

Attached to the right side of end plate 13 is a motor 21, shown in phantom, which is partially enclosed by a cylinder 22 perforated with openings 23 through the wall to the interior of the cylinder. The openings are located between annular ridges that support a recording medium above the openings. The cylinder or drum 22 is mounted by perforated internal disks 24 fixed on the motor output shaft 25. The right end of the motor shaft is supported on a bearing, not shown, in end plate 14. A portion of end plate 14 in alignment with the end of drum 22 is cut away to provide an opening communicating with the drum interior. To the right side of end plate 14 is mounted a fan and motor 26 which serves to evacuate the drum interior, attracting paper 27 to the drum surface area. A conical shield 28 secured between shaft 25 and the inner surface of the drum prevents air flow from the left end of the drum. Since drum 22 is supported on a plurality of perforated disks 24 which are secured to the output shaft of motor 21, the disk will rotate when the motor is energized and carry a sheet of paper 27 in front of carrier 11 and cartridge 12. The opposite end of the motor shaft 25 is fitted with pulleys 30, 31 for rotation therewith and serve to drive respective mating pulleys 32 (and 33, not shown) via belt 34 to rotate leadscrew 18. A timing disk 35 with alternate reflective and transparent areas is sensed by transducer 36 to provide a series of output pulses that serve as timing signals for operation of the printing drop generator of cartridge 12, as described hereinafter. It will be seen that as motor 21 rotates, lead screw 18 is rotated; since it is in engagement with the half-nut 19, carriage 11 will traverse rotating paper sheet 27 at a rate determined by the pitch of the threads on lead screw 18 and drive rate of pulleys 30,32, etc. A lever 39 is provided beneath carriage 11 to disengage half-nut 19 from lead screw 18 and allow carriage 11 to freely move along guides 16 and 20. For the purpose of loading a new sheet of paper onto drum 22 there is provided a plate 40 with edge guide 41. The paper is removed by stopping motor 21, and by fan motor, or by opening a vent door 42 on vacuum pump 26 to reduce the interior vacuum of the drum. Pulley pairs 30, 32, and 31, 33 provide different drive ratios to alter the print density on the paper by changing the rate at which carrier 11 traverses the paper and drum.

Control signals for ejecting droplets of marking fluid or ink from cartridge 12 are applied through conductors in ribbon cable 44 from a character generator 45 and system interface 46 through the control logic 47.

Figure 2:
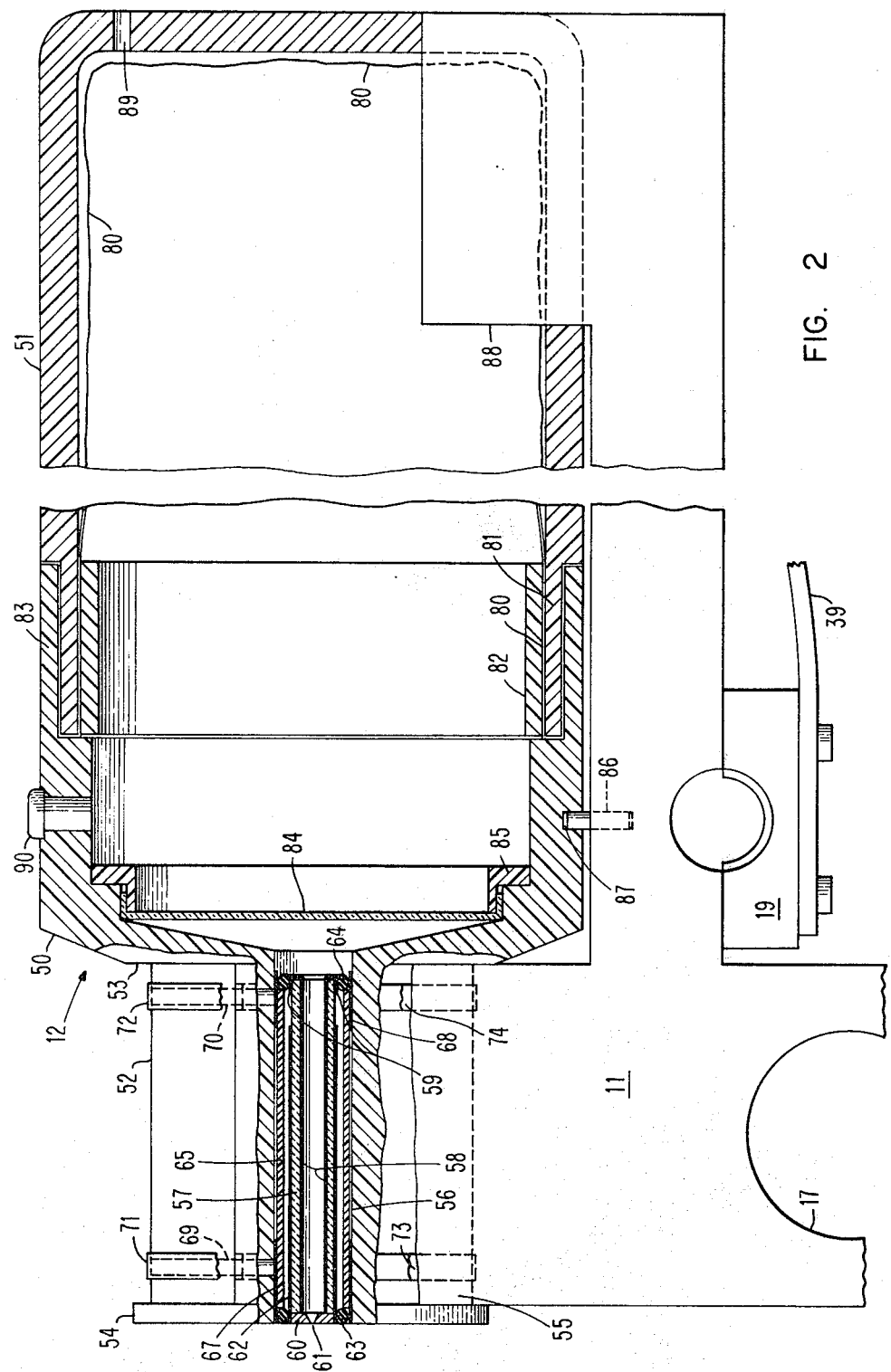
FIG. 2 is a sectional view of the cartridge of FIG. 1 showing the drop generator, filter and ink reservoir in more detail.

Cartridge 12 is shown in greater detail in FIG. 2 and comprises generally a first housing portion 50 and second housing portion 51 which can be assembled to form the unitary cartridge generally simulating a bottle. The housing is preferably molded of a plastic material.

Housing portion 50 has a neck 52 formed with inboard flange 53 and outboard flange 54 to position the cartridge longitudinally within a cradle portion 55 of carrier 11. Within an opening 56 in the neck there is inserted a cylinder or tube 57 of piezoelectric material which, when energized, will serve as a drop generator to expel droplets of ink. The tube has internal conductive plating 58 that is continuous over the rear edge to connect with a narrow band 59 on the outer surface of the tube. A nozzle plate 60 having an orifice 61 is fixed to the left end of tube 57 to form an opening for the ejection of ink droplets. The outer surface of tube 57 is also coated with an electrically conductive material 62 over most of its surface, but isolated or severed from band 59. The tube is supported in the housing on a pair of electrically conductive, resilient, elastomer o-rings 63, 64 separated by a non-conductive plastic tube 65 to maintain separation of the o-rings. The interior of housing opening 56 has a pair of electrically conductive bands 67, 68 that are in contact with respective o-rings 63, 64. Bands 67, 68 on the surface of opening 56 also interconnect with conductors 69 and 70 that bridge the wall of neck 52 and are joined with external conductive annular bands 71 and 72 and circling the neck. These bands lie in contact with similar semi-circular corresponding bands 73, 74 on the inner surface of cradle 55. Bands 73, 74 are each connected to conductors within ribbon cable 44 (FIG. 1). Signals from conductors in cable 44 are thus able to selectively energize the piezoelectric tube 57 to effect compression sufficient to form the direct droplets of ink from orifice 61 toward the recording medium.

Ink or marking liquid for the cartridge is contained in a bladder 80 within body portion 51 of the housing. Suitable bladder material for aqueous inks is that commonly used for finger cots or the like. An annular molded ring 82 is pushed into the interior of the body portion to hold the bladder in place and the open end of the bladder may be pulled back over the reduced diameter 81 of the body portion 51 along the outside thereof. Thereafter the neck and shoulder portion 50 of the housing is joined with the body portion as shown and may grip the edge of the bladder between reduced diameter portion 81 and the outer edge 83. A lubricant that is insoluble in the marking fluid aids in the foregoing assembly operation, and also seals against leakage of the fluids. To prevent the nozzle orifice 61 from becoming clogged, the ink from bladder is cleaned at filter 84 held in place by an annular ring 85. A disk of filter material may be formed of a finely perforated membrane.

As an aid in positioning cartridge 12 in carrier 11, a pin 86 is inserted in the housing to mate with recess 87 in the carrier body. Cartridge 12 is positioned at the rear of carrier 11 by a concave support 88 which is similar to the cradle 55 at the front. To allow bladder 80 to collapse as ink is consumed, a vent 89 is provided which permits the interior of the cartridge to maintain atmospheric pressure. The ejection of ink produces a slight negative pressure within the bladder causing it to collapse.

Since air in the liquid system will prevent proper operation of the squeeze tube or drop generator, care must be taken in filling the cartridge to ensure that air is not trapped inside. Filling is done by parting the two body portions and removing the filter. Ink is then placed within the squeeze tube area as the housing portion 50 held in an upright position so that the ink level is above the location of the filter. Thereafter the filter and its retaining ring 85 are inserted which ensures that there is no air between the filter and nozzle 61. Body portions 50 and 51 are joined with the bladder in place and filler plug 90 removed. The cartridge is tipped to approximately horizontal as shown in FIG. 2 and ink is then placed in the baldder until it reaches the plug opening and the plug is thereupon inserted.

In operation, the cartridge is placed in the cradles on the carrier and electrical signals are applied to the conductors in cable 44. This causes contractions of the squeeze tube which results in the generation of successive drops of liquid that are expelled toward the recording medium. As the vacuum drum rotates (FIG. 1) carrying paper 27, the head is traversed transversely thereof to form the characters by successive rows of selectively placed drops. This cartridge concept offers the advantage of an inexpensive assembly of drop generator, filter and ink supply which can be discarded after the ink supply has been consumed. This design permits the interchanging of nozzles of different size and inks of different colors or formulations as required.

The cartridge may be modified by adding nozzles to facilitate faster printing or different pel density as the print head traverses the recording paper. It may also be desirable to provide additional nozzles in the single cartridge and supply each nozzle with a different colored ink for the selective production of color printing. The modification shown in FIG. 3 permits the printing of two different colors. However, the nozzle and tube arrangement within the neck of the cartridge can be used with a single bladder or color of ink instead of the double bladder as shown. Like elements in the figures have been given like reference numerals. The elements of the second nozzle have been given reference numerals with suffixes "a". Not all elements have been designated because of the similarities with those in FIG. 2.

Figure 3:
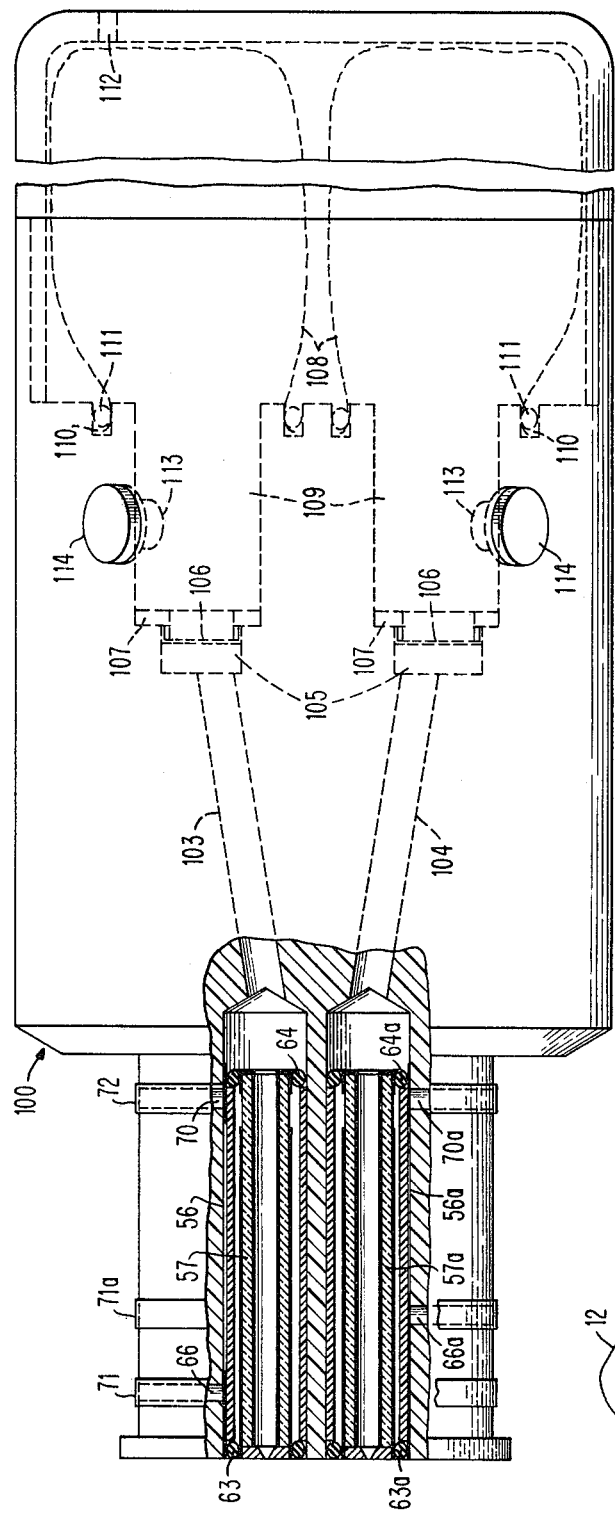
FIG. 3 is a sectional view of a modification of the ink cartridge of FIG. 1 in which a plurality of drop generators, filters and reservoirs are accommodated.

It will be noted in FIG. 3 that cartridge 100 carries two piezoelectric tubes 57 and 57a that are constructed in a similar manner and mounted on resilient annular rings 63, 63a, 64, and 64a. One difference will be noted however, which is the supply of ground or return electrode 70a which is also in contact with annular conductor 72 as is conductor 70. However, individual control circuits require respective annular rings 71 and 71a and conductors 66 and 66a. Each drop generator 56 and 56a is connected to its ink supply by means of a channel 103 or 104. These channels each further join a chamber 105 in which a filter 106 is held by retaining ring 107. Ink is supplied through the filters from respective bladders 108 which communicate with chamber 109. The bladders are each held in place by forcing the open end of the bladder into a recess 110 and then clamping the edge of the bladder with resilient ring 111. A vent hole 112 permits the bladders to collapse as ink is withdrawn. Each bladder chamber 108 and 109 communicates with a respective filler opening 113 which is blocked by plugs 114 after being filled. Although only two bladders are shown in cartridge 100, the interior structure of the cartridge body can be modified for additional compartments for different colors such as black and the three primary colors. In addition, the plurality of nozzles can be aligned horizontally or can be in different levels.

Figure 4:
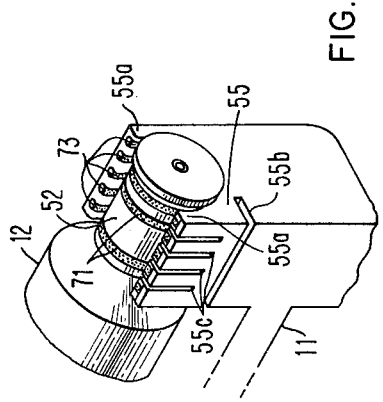
FIG. 4 is a perspective view of a position of the cartridge and cradle shown in FIG. 1.

The assembly of cartridge 12 and cradle 55 is shown in greater detail in FIG. 4. Cradle 55 is molded in a substantially semi-circular shape to conform to the cylindrical neck portion 52 of the cartridge so that reliable electrical contact is maintained between mating annular conductive bands 71 and semi-circular bands 73. However, to insure good contact, the radii of cradle 55 and bands 73 are made slightly smaller than that of the bands 71 to result in an interference fit when assembled. Cradle sides 55a extend tangentially a short distance above the end points of a horizontal transverse line through the center of the neck. The cradle portion or entire carrier 11 is preferably molded from a plastic material such as nylon or the like having some inherent resilience to allow deformation when the cartridge is inserted. Thus, the vertical sides 55a of the cradle can be moved laterally to accept the cartridge neck. A slot 55b may be cut on the side of the cradle to facilitate easier deflection of the side of the cradle. Also provided are vertical slots 55c to form separate supporting fingers for one end of each semi-circular band 73. This arrangement allows individual deflection of the bands 73 to accommodate variations in dimensions of the neck and annular bands 71.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A cartridge for ink drop printing apparatus comprising:
   housing means having an extended portion and forming a chamber communicating with said extended portion;
   drop generating means supported in said extended portion by at least two resilient conductive elements, said drop generating means having separate conductive coatings on opposite surfaces thereof;
   conductive paths on the exterior of said extended portion each connected through said extended portion to one of said resilient elements; and
   reservoir means in said chamber for holding a quantity of marking fluid and being in communication with said extended portion and said drop generating means.

2. Apparatus as described in claim 1 further including filter means between said drop generating means and said reservoir means.

3. Apparatus as described in claim 1 wherein said drop generating means includes a tubular piezoelectric device.

4. Apparatus as described in claim 1 wherein said resilient conductive elements are annular rings surrounding said drop generating means.

5. Apparatus as described in claim 1 wherein said drop generating means includes at least two piezoelectric devices mounted in said neck.

6. Apparatus as described in claim 5 wherein each said drop generating means is coupled with a respective reservoir means.

7. Apparatus as described in claim 1 wherein said cartridge is a molded two piece housing.

8. Apparatus as described in claim 1 wherein said drop generating means includes a piezoelectric tube having an orifice plate secured to one end thereof.

9. Apparatus as described in claim 1 wherein said reservoir means comprises a collapsible bladder.

10. Apparatus as described in claim 1 wherein said conductive paths are annular bands disposed about said extended portion.

11. In an ink drop printer, a translatable carrier movable relative to a record member comprising:
    cartridge means having therein drop generating means, an ink reservoir and first electrode means for controlling said drop generating means; and
    cradle means for supporting said cartridge means, said cradle means having a shape complementary to said cartridge means and second electrode means on said cradle connected with said first electrode means.

12. Apparatus as described in claim 11 wherein said drop generating means includes a piezoelectric device.

13. Apparatus as described in claim 12 wherein said cartridge means includes resilient conductive support means for said piezoelectric device to connect said device with said first circuit means.

14. Apparatus as described in claim 12 wherein said drop generating means includes at least a pair of resilient conductive support means for each said piezoelectric device.

15. Apparatus as described in claim 11 wherein said cartridge means further includes filter means interposed between said drop generating means and said reservoir.

16. Apparatus as described in claim 11 wherein said cartridge means includes a plurality of drop generating means.

17. Apparatus as described in claim 11 wherein said cradle means includes alignment means between said cartridge means and said cradle means.

18. Apparatus as described in claim 11 wherein said cradle means resiliently grips said cartridge means to engage said first and second electrode means.

19. In an ink drop printer, a translatable carrier movable relative to a record member comprising:
cartridge means having an ink reservoir and a cylindrical neck portion with drop generating means therein and annular electrodes thereon connected with said drop generating means; and
cradle means for supporting said cartridge means, said cradle means having a concave shape complementary to said neck portion and second electrodes connectable with said annular electrodes.

20. Apparatus as described in claim 19 wherein said second electrode means are semi-circular bands on the concave portion of said cradle.

21. Apparatus as described in claim 19 wherein said drop generating means includes a cylindrical piezoelectric tube mounted on a pair of electrically conductive elastomer supports.

22. Apparatus as described in claim 19 wherein said drop generating means includes a plurality of piezoelectric tubes, each having a nozzle plate thereon.

23. Apparatus as described in claim 19 wherein said cradle means is formed to resiliently grip said cartridge means.

* * * * *